US012808331B2

(12) United States Patent
Okui et al.

(10) Patent No.: US 12,808,331 B2
(45) Date of Patent: Nov. 24, 2026

(54) GAS TURBINE SYSTEM AND BLEED CONTROL METHOD THEREOF

(71) Applicant: MITSUBISHI HEAVY INDUSTRIES, LTD., Tokyo (JP)

(72) Inventors: Hidetaka Okui, Tokyo (JP); Masao Terazaki, Tokyo (JP); Masanori Fujioka, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 19/288,283

(22) Filed: Aug. 1, 2025

(65) Prior Publication Data

US 2026/0043359 A1 Feb. 12, 2026

(30) Foreign Application Priority Data

Aug. 9, 2024 (JP) ................................ 2024-134542

(51) Int. Cl.

| | |
|---|---|
| ***F02C 9/18*** | (2006.01) |
| ***F02C 3/13*** | (2006.01) |
| ***F02C 6/08*** | (2006.01) |
| ***F02C 7/277*** | (2006.01) |
| ***F02C 7/32*** | (2006.01) |

(52) U.S. Cl.

CPC .................. *F02C 9/18* (2013.01); *F02C 3/13* (2013.01); *F02C 6/08* (2013.01); *F02C 7/277* (2013.01); *F02C 7/32* (2013.01)

(58) Field of Classification Search

CPC .... F02C 3/13; F02C 6/08; F02C 7/277; F02C 7/32; F02C 9/18

See application file for complete search history.

(56) References Cited

U.S. PATENT DOCUMENTS

| | | | | |
|---|---|---|---|---|
| 4,102,595 | A * | 7/1978 | Wibbelsman | F04D 27/0223 415/28 |
| 9,228,501 | B2 * | 1/2016 | Oliverio | F02C 9/52 |
| 11,168,619 | B2 * | 11/2021 | Iwrey | F02C 3/10 |
| 11,572,841 | B2 * | 2/2023 | Esaki | F02C 6/18 |
| 2014/0026588 | A1 * | 1/2014 | Velez | F02C 3/13 60/785 |
| 2014/0250898 | A1 * | 9/2014 | Mackin | F02C 7/047 60/785 |
| 2017/0101937 | A1 | 4/2017 | Schlarman et al. | |
| 2023/0228213 | A1 | 7/2023 | Miller et al. | |

* cited by examiner

*Primary Examiner* — Kyle Robert Thomas

(74) *Attorney, Agent, or Firm* — Wenderoth, Lind & Ponack, L.L.P.

(57) ABSTRACT

A gas turbine system includes a gas turbine, a bleed line through which a part of compressed air generated by a compressor of the gas turbine is bled from the gas turbine as bleed air, an exhaust line that branches off from a middle of the bleed line, an auxiliary turbine that is driven by the bleed air which has flowed through the bleed line, a bleed amount adjustment valve that is provided in the bleed line and that is configured to adjust the flow rate of the bleed air bled from the gas turbine, an inflow amount adjustment valve that is provided in the bleed line and that is configured to adjust the flow rate of the bleed air flowing into the auxiliary turbine, and an exhaust amount adjustment valve that is provided in the exhaust line and that is configured to adjust the flow rate of the bleed air exhausted from the bleed line.

3 Claims, 5 Drawing Sheets

GAS TURBINE SYSTEM AND BLEED CONTROL METHOD THEREOF

BACKGROUND OF THE INVENTION

Field of the Invention

The present disclosure relates to a gas turbine system including a gas turbine, and a bleed control method thereof.

Priority is claimed on Japanese Patent Application No. 2024-134542, filed on Aug. 9, 2024, the content of which is incorporated herein by reference.

Description of Related Art

A gas turbine includes a compressor that compresses air, a combustor that generates combustion gas by combusting fuel in the air compressed by the compressor, and a turbine driven by the combustion gas.

United States Patent Application, Publication No. 2023/0228213 discloses a related technology for reducing an output of the gas turbine. In this technology, an amount of air supplied to the combustor is reduced by bleeding a part of the air compressed by the compressor from the gas turbine in reducing the output of the gas turbine. High-pressure air bled from the gas turbine is sent to an air expansion turbine through a bleed line. The air expansion turbine is connected to a mechanical load. The bleed line connects the gas turbine to the air expansion turbine. A branch line extending from a low-pressure secondary pressure source is connected to the bleed line.

SUMMARY OF THE INVENTION

Even when the output of the gas turbine is reduced, it is desirable to stably operate the gas turbine and a turbine that can be driven by the air bled from the gas turbine.

Therefore, an object of the present disclosure is to provide a technology for stably operating a gas turbine and a turbine that can be driven by air bled from the gas turbine, even in reducing an output of the gas turbine.

A gas turbine system as one aspect for achieving the above object includes a gas turbine including a compressor that is configured to compress air, a combustor that is configured to generate combustion gas by combusting fuel in compressed air which is the air compressed by the compressor, and a turbine that is driven by the combustion gas, a bleed line through which a part of the compressed air generated by the compressor is bled from the gas turbine as bleed air, an exhaust line that branches off from a middle of the bleed line and through which a part of the bleed air which has flowed into the bleed line is exhausted, an auxiliary turbine that is connected to the bleed line and driven by the bleed air which has flowed through the bleed line, a bleed amount adjustment valve that is provided in the bleed line and that is configured to adjust the bleed amount which is the flow rate of the bleed air bled from the gas turbine, an inflow amount adjustment valve that is provided in the bleed line and that is configured to adjust the inflow amount which is the flow rate of the bleed air flowing into the auxiliary turbine, and an exhaust amount adjustment valve that is provided in the exhaust line and that is configured to adjust the exhaust amount which is the flow rate of the bleed air exhausted from the bleed line.

In the present aspect, a part of the compressed air generated by the compressor is bled from the gas turbine as the bleed air by opening the bleed amount adjustment valve. Thus, in the present aspect, the flow rate of the compressed air flowing into the combustor can be less than the minimum intake flow rate of the gas turbine. The combustor is supplied with the fuel corresponding to the flow rate of the compressed air flowing into the combustor for stable combustion of the fuel. Thus, in the present aspect, the flow rate of the combustion gas flowing into the turbine from the combustor can be decreased while stably combusting the fuel. Accordingly, in the present aspect, even in a case where required output from the outside is less than output corresponding to the minimum intake flow rate of the gas turbine, the required output can be fulfilled.

Furthermore, in the present aspect, by adjusting each of the opening degree of the bleed amount adjustment valve, the opening degree of the inflow amount adjustment valve, and the opening degree of the exhaust amount adjustment valve, the bleed amount that is the flow rate of the bleed air bled from the gas turbine can be maintained to be constant while appropriately adjusting the flow rate of the bleed air flowing into the auxiliary turbine. Thus, in the present aspect, the gas turbine and the auxiliary turbine can be stably operated even in reducing output of the gas turbine.

A bleed control method of a gas turbine system as one aspect for achieving the object is applied to the following gas turbine system.

The gas turbine system includes a gas turbine including a compressor that compresses air, a combustor that generates combustion gas by combusting fuel in compressed air which is the air compressed by the compressor, and a turbine that is driven by the combustion gas, a bleed line through which a part of the compressed air generated by the compressor is bled from the gas turbine as bleed air, an exhaust line that branches off from a middle of the bleed line and through which a part of the bleed air which has flowed into the bleed line is exhausted, and an auxiliary turbine that is connected to the bleed line and driven by the bleed air which has flowed through the bleed line.

The bleed control method of a gas turbine system includes a bleed control step of adjusting the bleed amount that is the flow rate of the bleed air bled from the gas turbine, adjusting the inflow amount that is the flow rate of the bleed air flowing into the auxiliary turbine, and adjusting the exhaust amount that is the flow rate of the bleed air exhausted from the bleed line.

In the present aspect, as in the gas turbine system in the one aspect, even in a case where the required output from the outside is less than the output corresponding to the minimum intake flow rate of the gas turbine, the required output can be fulfilled by opening the bleed amount adjustment valve.

Furthermore, in the present aspect, by adjusting each of the opening degree of the bleed amount adjustment valve, the opening degree of the inflow amount adjustment valve, and the opening degree of the exhaust amount adjustment valve, the bleed amount that is the flow rate of the bleed air bled from the gas turbine can be maintained to be constant while appropriately adjusting the flow rate of the bleed air flowing into the auxiliary turbine. Thus, even in the present aspect, the gas turbine and the auxiliary turbine can be stably operated even in reducing the output of the gas turbine.

In one aspect of the present disclosure, even when the output of the gas turbine is reduced, the gas turbine and a turbine that can be driven by the air bled from the gas turbine can be stably operated.

DETAILED DESCRIPTION OF THE INVENTION

Hereinafter, an embodiment of a gas turbine system according to the present disclosure will be described with reference to the drawings.

Embodiment of Gas Turbine System

Hereinafter, one embodiment of the gas turbine system according to the present disclosure will be described with reference to FIGS. 1 to 5.

Figure 1:
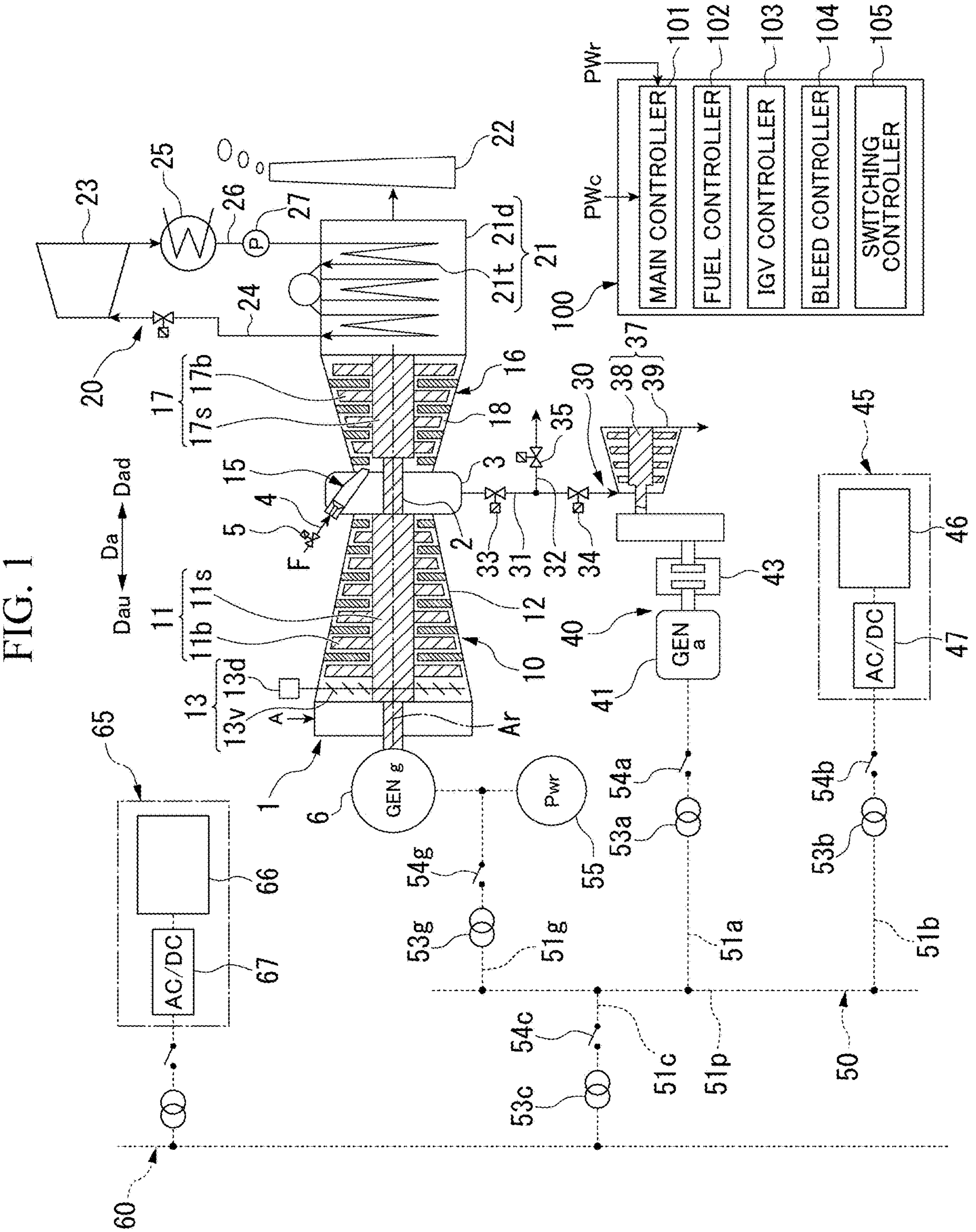
FIG. 1 is a system diagram of a gas turbine system in one embodiment according to the present disclosure.

As shown in FIG. 1, the gas turbine system in the present embodiment includes a gas turbine 1, exhaust heat use equipment 20 with which heat of exhaust gas exhausted from the gas turbine 1 can be used, a gas turbine generator 6 that can generate power by driving the gas turbine 1, a bleed device 30 that can bleed a part of air in the gas turbine 1 to the outside, auxiliary power generation equipment 40, power system equipment 50, and a control device 100. That is, the gas turbine system in the present embodiment is a gas turbine power generation plant.

The gas turbine 1 includes a compressor 10 that can compress air A, a combustor 15 that can generate combustion gas by combusting fuel F in compressed air which is the air compressed by the compressor 10, a fuel valve 5, a turbine 16 that can be driven by high-temperature and high-pressure combustion gas, and an intermediate casing 3.

The compressor 10 includes a compressor rotor 11 that rotates about a rotor axis Ar, a compressor casing 12 that covers the compressor rotor 11, and an intake amount adjuster 13. Here, a direction in which the rotor axis Ar extends will be referred to as an axis direction Da. One of both sides in the axis direction Da will be referred to as an axis upstream side Dau, and the other will be referred to as an axis downstream side Dad.

The compressor rotor 11 includes a compressor rotor shaft 11*s* that is centered on the rotor axis Ar and extends in the axis direction Da, and a plurality of blade rows 11*b* that are fixed to the compressor rotor shaft 11*s*. The plurality of blade rows 11*b* are arranged in the axis direction Da. Each of the plurality of blade rows 11*b* includes a plurality of blades arranged in a circumferential direction of the rotor axis Ar. The intake amount adjuster 13 includes a plurality of inlet guide vanes (referred to as IGVs) 13*v* that are disposed on the axis upstream side Dau with respect to the plurality of blade rows 11*b* in the compressor casing 12, and a driver 13*d* that can change the direction of each inlet guide vane 13*v*.

The turbine 16 is disposed on the axis downstream side Dad of the compressor 10. The turbine 16 includes a turbine rotor 17 that rotates about the rotor axis Ar by the combustion gas from the combustor 15, and a turbine casing 18 that covers the turbine rotor 17.

The turbine rotor 17 includes a turbine rotor shaft 17*s* that is centered on the rotor axis Ar and extends in the axis direction Da, and a plurality of blade rows 17*b* that are fixed to the turbine rotor shaft 17*s*. The plurality of blade rows 17*b* are arranged in the axis direction Da. Each of the plurality of blade rows 17*b* includes a plurality of blades arranged in the circumferential direction of the rotor axis Ar.

The turbine rotor 17 and the compressor rotor 11 are connected to each other to be rotatable as a whole about the same rotor axis Ar and form a gas turbine rotor 2. A rotor of the gas turbine generator 6 is connected to the gas turbine rotor 2.

The intermediate casing 3 is disposed between the compressor casing 12 and the turbine casing 18 in the axis direction Da and connects the compressor casing 12 to the turbine casing 18. The compressed air discharged from the compressor 10 flows into the intermediate casing 3. The combustor 15 is fixed to the intermediate casing 3. A fuel line 4 is connected to the combustor 15. The fuel line 4 is provided with the above fuel valve 5 that adjusts the flow rate of the fuel F flowing through the fuel line 4.

The exhaust heat use equipment 20 includes an exhaust heat recovery boiler 21, a chimney 22, a steam turbine 23 that can be driven by steam from the exhaust heat recovery boiler 21, a main steam line 24 that can guide the steam generated by the exhaust heat recovery boiler 21 to the steam turbine 23, a condenser 25 that can restore the steam exhausted from the steam turbine 23 to water, a water supply line 26 that can guide the water in the condenser 25 to the exhaust heat recovery boiler 21, and a water supply pump 27 provided in the water supply line 26. A drive target that can be rotated through rotation of a rotor of the steam turbine 23 is connected to the rotor of the steam turbine 23. The rotor of the gas turbine generator 6, a rotor of an ST generator that is independent of the gas turbine generator 6, and an impeller of a pump are exemplary examples of the drive target.

The exhaust heat recovery boiler 21 can generate the steam by evaporating water using the heat of the exhaust gas that is the combustion gas exhausted from the turbine 16. The exhaust heat recovery boiler 21 includes a duct 21*d* connected to the turbine casing 18, and a heat transfer tube 21*t* disposed in the duct 21*d*. The exhaust gas from the turbine 16 flows into the duct 21*d*. Water as liquid or water as gas flows into the heat transfer tube 21*t*. One end of the heat transfer tube 21*t* forms a water inlet and is connected to the water supply line 26. The other end of the heat transfer tube 21*t* forms a steam outlet and is connected to the main steam line 24. The chimney 22 is connected to the duct 21*d* of the exhaust heat recovery boiler 21.

The bleed device 30 includes a bleed line 31, an exhaust line 32, an auxiliary turbine 37, a bleed amount adjustment valve 33, an inflow amount adjustment valve 34, and an exhaust amount adjustment valve 35.

The bleed line 31 is a line through which a part of the compressed air generated by the compressor 10 can be bled from the gas turbine 1 as bleed air. The exhaust line 32 is a line that branches off from the middle of the bleed line 31 and through which a part of the bleed air that has flowed into the bleed line 31 can be exhausted.

The auxiliary turbine 37 includes a rotatable auxiliary turbine rotor 38, and an auxiliary turbine casing 39 that covers the auxiliary turbine rotor 38. One of both ends of the bleed line 31 is connected to the intermediate casing 3 of the gas turbine 1. The other end of the bleed line 31 is connected to the auxiliary turbine casing 39. Thus, a part of the compressed air that has flowed into the intermediate casing 3 can flow into the auxiliary turbine casing 39 as the bleed air through the bleed line 31. The auxiliary turbine rotor 38 rotates by the bleed air that has flowed into the auxiliary turbine casing 39.

The bleed amount adjustment valve 33 is provided in a part on a side closer to the gas turbine 1 with respect to a branch position of the exhaust line 32 in the bleed line 31. The bleed amount adjustment valve 33 can adjust a bleed amount that is the flow rate of the bleed air from the gas turbine 1. The inflow amount adjustment valve 34 is provided in a part on a side closer to the auxiliary turbine 37 with respect to the branch position of the exhaust line 32 in the bleed line 31. The inflow amount adjustment valve 34 can adjust the inflow amount that is the flow rate of the bleed air flowing into the auxiliary turbine 37. The exhaust amount adjustment valve 35 is provided in the exhaust line 32. The exhaust amount adjustment valve 35 can adjust the exhaust amount that is the flow rate of the bleed air exhausted from the bleed line 31.

The auxiliary power generation equipment 40 includes a speed changer 42, a clutch 43, an auxiliary power generator 41, and a power storage device 45.

The speed changer 42 is a speed reducer including an input shaft, an output shaft, and a speed reduction mechanism that reduces a rotation speed of the input shaft and transmits the reduced rotation speed to the output shaft. The input shaft of the speed changer 42 is connected to the auxiliary turbine rotor 38. The clutch 43 includes an input shaft, an output shaft, and a clutch mechanism provided between the input shaft and the output shaft. The clutch mechanism can change a connection state between the input shaft and the output shaft, between a transmission state where drive force from the input shaft is transmitted to the output shaft, and a disconnection state where the drive force from the input shaft is not transmitted to the output shaft. The input shaft of the clutch 43 is connected to the output shaft of the speed changer 42. The output shaft of the clutch 43 is connected to a rotor of the auxiliary power generator 41. As described above, the rotor of the auxiliary power generator 41 is mechanically connected to the auxiliary turbine rotor 38 through the speed changer 42 and the clutch 43. Thus, the auxiliary power generator 41 is a power generator that can generate power by driving the auxiliary turbine 37.

In the present embodiment, each of the auxiliary power generator 41 and the gas turbine generator 6 is a synchronous power generator.

The power storage device 45 includes a storage battery 46 and an AC/DC converter 47. The AC/DC converter 47 can convert alternating current power from the outside into direct current power and send the direct current power to the storage battery 46, and can convert direct current power from the storage battery 46 into alternating current power and send the alternating current power to the outside.

The power system equipment 50 includes a GT power generator dedicated power line 51*g*, an AT power generator dedicated power line 51*a*, a BESS dedicated power line 51*b*, an in-plant shared power line 51*p*, an external connection power line 51*c*, a plurality of transformers 53*a*, 53*b*, 53*c*, and 53*g*, and a plurality of switches 54*a*, 54*b*, 54*c*, and 54*g*. One end of the GT power generator dedicated power line 51*g* is electrically connected to the gas turbine generator 6, and the other end of the GT power generator dedicated power line 51*g* is electrically connected to the in-plant shared power line 51*p*. One end of the AT power generator dedicated power line 51*a* is electrically connected to the auxiliary power generator 41, and the other end of the AT power generator dedicated power line 51*a* is electrically connected to the in-plant shared power line 51*p*. One end of the BESS dedicated power line 51*b* is electrically connected to the power storage device 45, and the other end of the BESS dedicated power line 51*b* is connected to the in-plant shared power line 51*p*. The external connection power line 51*c* electrically connects the in-plant shared power line 51*p* to an external power system 60.

The power storage device 65 is connected to the external power system 60 in order to compensate for a change in a power generation amount in power generation equipment using renewable energy such as solar energy or wind energy. The power storage device 65, like the power storage device 45 included in the gas turbine system (a gas turbine power generation plant) in the present embodiment), includes a storage battery 66 and an AC/DC converter 67.

The GT power generator dedicated power line 51*g* is provided with the transformer 53*g* and the switch 54*g*. An output meter 55 that detects a power generation amount of the gas turbine generator 6, in other words, actual output PWr that is the actual output of the gas turbine 1, is connected to the GT power generator dedicated power line 51*g*. The AT power generator dedicated power line 51*a* is provided with the transformer 53*a* and the switch 54*a*. The BESS dedicated power line 51*b* is provided with the transformer 53*b* and the switch 54*b*. The external connection power line 51*c* is provided with the transformer 53*c* and the switch 54*c*. Each of the above switches 54*a*, 54*b*, 54*c*, and 54*g* includes a first terminal, a second terminal, and a switching mechanism. The switching mechanism can change a connection state between the first terminal and the second terminal, between an ON state where the first terminal and the second terminal are electrically connected and an OFF state where the first terminal and the second terminal are not electrically connected. Thus, for example, the switch 54*a* provided in the AT power generator dedicated power line 51*a* can implement an ON state where other power lines 51*g*, 51*b*, 51*c*, and 51*p* constituting the power system and the auxiliary power generator 41 are electrically connected, and an OFF state where the other power lines 51*g*, 51*b*, 51*c*, and 51*p* constituting the power system and the auxiliary power generator 41 are not electrically connected.

The control device 100 includes a main controller 101, a fuel controller 102, an IGV controller 103, a bleed controller 104, and a switching controller 105.

The main controller 101 receives various instructions related to the plant, including required output PWc required for the gas turbine 1, from the outside, the actual output PWr detected by the output meter 55, and the like and controls each of the other controllers.

The fuel controller 102 receives the above required output PWc and the actual output PWr from the main controller 101, determines an opening degree of the fuel valve 5 in accordance with a deviation between the required output PWc and the actual output PWr, and provides an instruction indicating the opening degree to the fuel valve 5. A change in the flow rate of the fuel supplied to the combustor 15 has a positive correlation with a change in the opening degree of the fuel valve 5. The change in the opening degree of the fuel valve 5 has a positive correlation with a change in the required output PWc. Thus, the change in the flow rate of the fuel supplied to the combustor 15 has a positive correlation with the change in the required output PWc. Accordingly, in a case where the required output PWc is increased, the flow rate of the fuel supplied to the combustor 15 is increased. In a case where the required output PWc is decreased, the flow rate of the fuel supplied to the combustor 15 is decreased.

Figure 2:
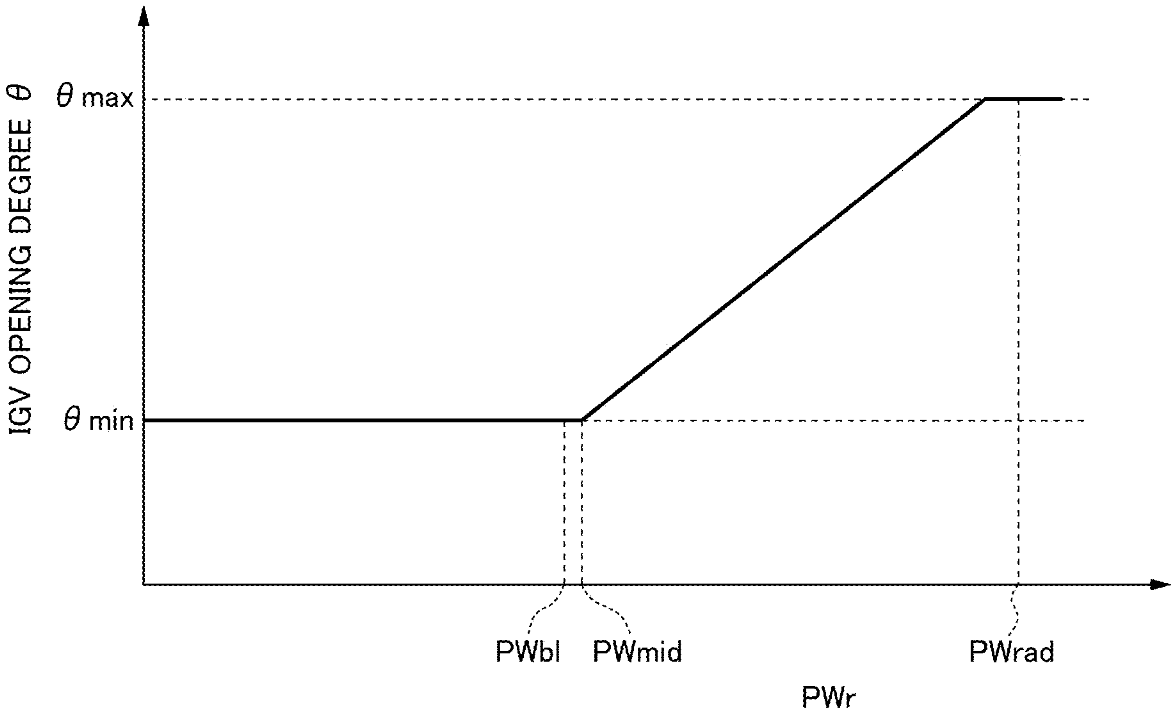
FIG. 2 is a graph showing a relationship between an actual output and an IGV opening degree of a gas turbine in one embodiment according to the present disclosure.

The IGV controller 103 receives the actual output PWr from the main controller 101, determines an IGV opening degree θ in accordance with the actual output PWr, and provides an instruction indicating the IGV opening degree θ to the intake amount adjuster 13. As shown in FIG. 2, in a case where the actual output PWr is between intermediate output PWmid and rated output PWrad, a change in the IGV opening degree θ has a positive correlation with a change in the actual output PWr. Accordingly, as the actual output PWr is increased, the IGV opening degree θ is also increased. As the actual output PWr is decreased, the IGV opening degree θ is also decreased. In a case where the actual output PWr is the intermediate output PWmid, the IGV opening degree θ is a minimum opening degree θmin. In a case where the actual output PWr is the rated output PWrad, the IGV opening degree θ is a maximum opening degree θmax. Thus, the intermediate output PWmid can be said to be the maximum actual output PWr in a case where the IGV opening degree θ is the minimum opening degree θmin.

The bleed controller 104 receives the actual output PWr from the main controller 101 and controls an opening degree of the bleed amount adjustment valve 33, an opening degree of the inflow amount adjustment valve 34, and an opening degree of the exhaust amount adjustment valve 35 in accordance with whether or not the actual output PWr satisfies a bleed condition. Here, the bleed condition indicates that the actual output PWr detected by the output meter 55 is less than or equal to predetermined bleed output PWbl. Here, as shown in FIG. 2, the bleed output PWbl is output less than the above intermediate output PWmid. In a case where it is determined that the actual output PWr detected by the output meter 55 satisfies the bleed condition, in other words, the actual output PWr is less than or equal to the bleed output PWbl, the bleed controller 104 starts controlling the opening degree of the bleed amount adjustment valve 33, the opening degree of the inflow amount adjustment valve 34, and the opening degree of the exhaust amount adjustment valve 35.

The switching controller 105 controls each of the switches 54*a,* 54*b,* 54*c,* and 54*g.* In a case where an emergency that affects the gas turbine system (the gas turbine power generation plant) occurs, the switching controller 105 instructs the switches 54*a*, 54*b,* 54*c,* and 54*g* corresponding to the emergency to enter the OFF state. The switching controller 105 instructs the switch 54*b* provided in the BESS dedicated power line 51*b* to enter the ON state or the OFF state in accordance with whether the bleed amount adjustment valve 33 is open or closed and a discharging condition (described later). In a case where the discharging condition is satisfied, and the bleed amount adjustment valve 33 is open, the switching controller 105 instructs the switch 54*b* to enter the ON state. In a case where the discharging condition is not satisfied, and the bleed amount adjustment valve 33 is not open, the switching controller 105 instructs the switch 54*b* to enter the OFF state.

Figure 3:
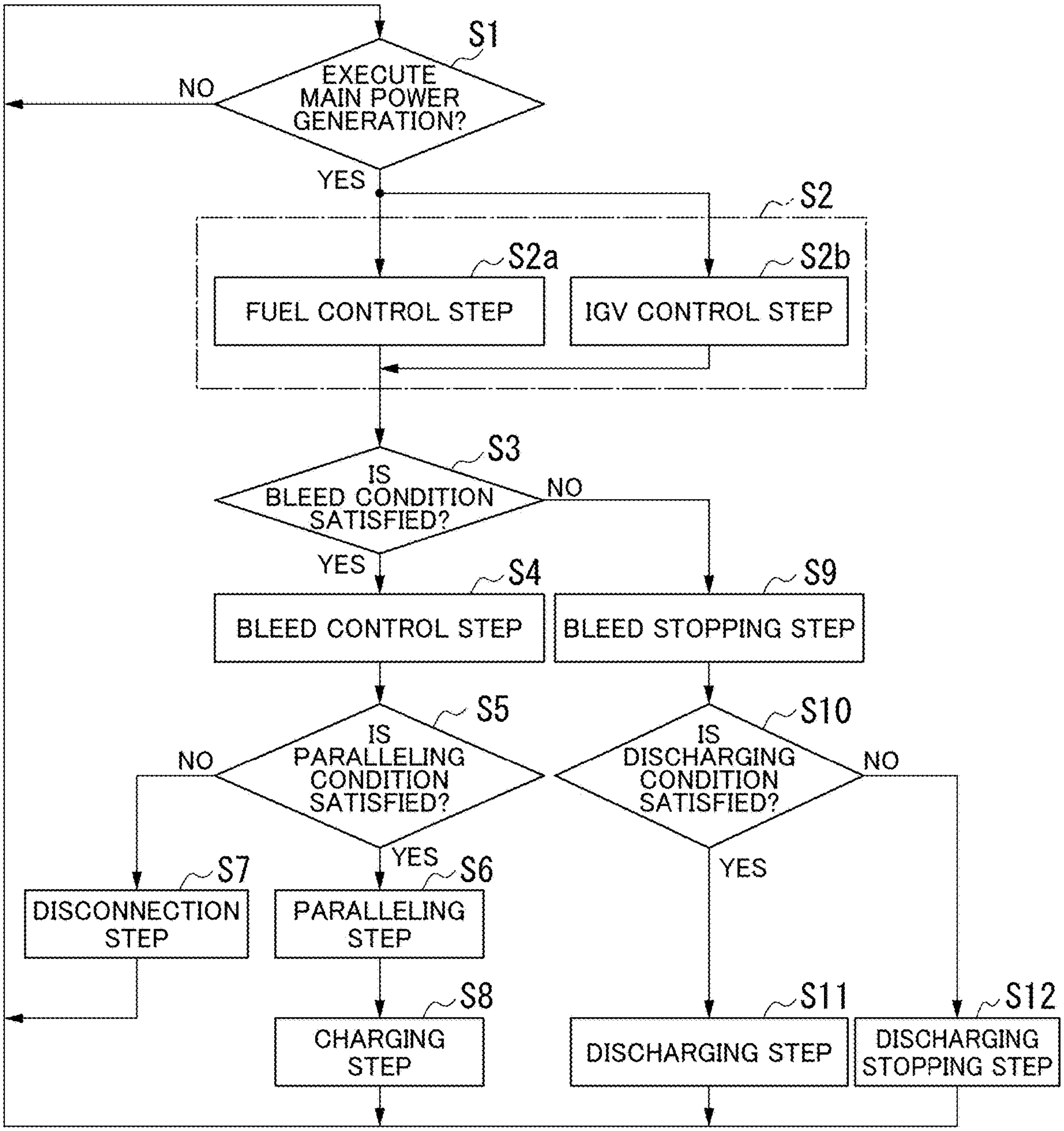
FIG. 3 is a flowchart showing the overall operation of the gas turbine system in one embodiment according to the present disclosure.

Next, an operation of the gas turbine system will be described in accordance with the flowchart shown in FIG. 3.

First, the main controller 101 determines whether or not to execute main power generation of causing the gas turbine generator 6 to generate power by driving the gas turbine 1 (a main power generation execution determination step S1). In a case where the main controller 101 determines to execute the main power generation, the main controller 101 instructs the fuel controller 102 and the IGV controller 103 to execute a main power generation step S2.

The main power generation step S2 includes a fuel control step S2*a* of controlling a fuel flow rate via the fuel controller 102, and an IGV control step S2*b* of controlling an intake flow rate of the gas turbine 1 via the IGV controller 103.

In the fuel control step S2*a,* the fuel controller 102 receives the required output PWc from the outside and the actual output PWr detected by the output meter 55. The fuel controller 102 determines the opening degree of the fuel valve 5 in accordance with the deviation between the required output PWc and the actual output PWr and provides an instruction indicating the opening degree to the fuel valve 5. Thus, as described above, the flow rate of the fuel supplied to the combustor 15 is basically set to a value having a positive correlation with the required output PWc. In a case where the required output PWc is less than or equal to the rated output PWrad, the combustor 15 is supplied with the fuel corresponding to the required output PWc. However, in a case where the required output PWc is greater than the rated output PWRad, the combustor 15 is not supplied with the fuel corresponding to the required output PWc and is supplied with the fuel corresponding to the rated output PWrad from the viewpoint of protecting the combustor 15 and the turbine 16. Thus, output of the gas turbine 1 is basically not greater than the rated output PWrad.

In the IGV control step S2*b,* the IGV controller 103 receives the actual output PWr detected by the output meter 55. The IGV controller 103 determines the IGV opening degree θ in accordance with the actual output PWr and provides an instruction indicating the IGV opening degree θ to the intake amount adjuster 13 (the IGV control step S2*b*). In this case, as described above using FIG. 2, the IGV opening degree θ is set to a value having a positive correlation with the actual output PWr. However, in a case where the actual output PWr is less than or equal to the intermediate output PWmid, the IGV opening degree θ is maintained at the minimum opening degree θmin. In a case where the actual output PWr is the rated output PWrad, the IGV opening degree θ is maintained at the maximum opening degree θmax. Thus, in a case where the actual output PWr is less than or equal to the intermediate output PWmid, the intake flow rate of the gas turbine 1 is maintained at the minimum flow rate. In a case where the actual output PWr is the rated output PWrad, the intake flow rate of the gas turbine 1 is maintained at the maximum flow rate.

Through the above execution of the fuel control step S2*a* and the IGV control step S2*b,* the gas turbine 1 is driven, and the gas turbine generator 6 generates power.

In a case where the required output PWc from the outside is less than or equal to the rated output PWrad and is greater than the bleed output PWbl, the bleed amount adjustment valve 33 is closed, the inflow amount adjustment valve 34 is closed, and the exhaust amount adjustment valve 35 is closed. Furthermore, in this case, the switch 54*g* provided in the GT power generator dedicated power line 51*g* is in the ON state, the switch 54*a* provided in the AT power generator dedicated power line 51*a* is in the OFF state, and the switch 54*c* provided in the external connection power line 51*c* is in the ON state. In this case, the gas turbine generator 6 supplies the actual output PWr corresponding to the required output PWc to the external power system 60. Since the bleed amount adjustment valve 33 is closed, the compressed air in the intermediate casing 3 is not supplied to the auxiliary turbine 37 through the bleed line 31, and the auxiliary turbine 37 is not driven. The switch 54*b* provided in the BESS dedicated power line 51*b* is in the OFF state. Thus, input and output of power into and from the power storage device 45 are not executed. That is, power is not charged in the power storage device 45, and the power storage device 45 is not discharged.

The bleed controller 104 determines whether or not the bleed condition for bleeding a part of the compressed air in the intermediate casing 3 as the bleed air is satisfied (a bleed condition determination step S3). As described above, the bleed condition indicates that the actual output PWr detected by the output meter 55 is less than or equal to the bleed output PWbl. In a case where it is determined that the bleed condition is satisfied, the bleed controller 104 executes a bleed control step S4. In the bleed control step S4, the bleed controller 104 controls the opening degree of the bleed amount adjustment valve 33, the opening degree of the inflow amount adjustment valve 34, and the opening degree of the exhaust amount adjustment valve 35, and a part of the compressed air in the intermediate casing 3 is bled as the bleed air. The execution of the bleed control step S4 continues until a bleed stopping step S9 (described later) is executed. Details of the bleed control step S4 will be described later.

In a case where the bleed control step S4 starts, the bleed air is supplied to the auxiliary turbine 37, and driving of the auxiliary turbine 37 starts by the inflow of the bleed air.

In a case where driving of the auxiliary turbine 37 starts, the switching controller 105 determines whether or not a paralleling condition related to the auxiliary power generator 41 is satisfied (a paralleling condition determination step S5). The paralleling condition indicates whether or not a rotation speed of the auxiliary power generator 41 is equal to a predetermined rated rotation speed. The phrase "the rotation speed of the auxiliary power generator 41 is equal to the rated rotation speed" includes not only a case where the rotation speed of the auxiliary power generator 41 completely matches the rated rotation speed, but also a case where the rotation speed of the auxiliary power generator 41 is within a range of, for example, ±3% of the rated rotation speed. In a case where it is determined that the paralleling condition is satisfied, in other words, the rotation speed of the auxiliary power generator 41 is equal to the predetermined rated rotation speed, the switching controller 105 sets the switch 54*a* provided in the AT power generator dedicated power line 51*a* to enter the ON state. That is, a paralleling step S6 is executed.

In a case where the switching controller 105 sets the switch 54*a* provided in the AT power generator dedicated power line 51*a* to enter the ON state, the switching controller 105 also sets the switch 54*b* provided in the BESS dedicated power line 51*b* to enter the ON state. Accordingly, a state where the auxiliary power generator 41 and the power storage device 45 are electrically connected is set, and the power generated by the auxiliary power generator 41 is charged in the power storage device 45 (a charging step S8).

In a case where it is determined that the paralleling condition is not satisfied during the execution of the paralleling step S6, the switching controller 105 sets the switch 54*a* provided in the AT power generator dedicated power line 51*a* to enter the OFF state. That is, a disconnection step S7 is executed. Thus, power is not supplied from the auxiliary power generator 41 to the outside.

In a case where the switching controller 105 sets the switch 54*a* provided in the AT power generator dedicated power line 51*a* to enter the OFF state, the switching controller 105 also sets the switch 54*b* provided in the BESS dedicated power line 51*b* to enter the OFF state.

It is assumed that the bleed control step S4 is not executed even in a case where the actual output PWr is less than or equal to the bleed output PWbl. In this case, the flow rate of the fuel supplied to the combustor 15 is set to a value having a positive correlation with the required output PWc, but the flow rate of the air taken into the compressor 10 is maintained at a flow rate in a case where the actual output PWr is the intermediate output PWmid. Thus, a fuel-air ratio that is a ratio of a fuel flow rate to an air flow rate in the combustor 15 is decreased below the fuel-air ratio in a case where the actual output PWr is the intermediate output PWmid. In a case where the fuel-air ratio is decreased, a temperature of the combustion gas flowing into the turbine 16 from the combustor 15 is decreased, and a temperature of the steam generated in the exhaust heat recovery boiler 21 is decreased. Accordingly, output efficiency of the exhaust heat use equipment 20 is decreased. As the fuel-air ratio is decreased, combustibility of the fuel deteriorates, and in the worst case, misfiring may occur.

While the same description is repeated, in a case where the required output PWc is less than or equal to the bleed output PWbl, the bleed control step S4 is executed, and a part of the compressed air in the intermediate casing 3 is bled as the bleed air. Thus, by decreasing the flow rate of the compressed air flowing into the combustor 15 below the minimum intake flow rate of the gas turbine 1 and supplying the fuel corresponding to the required output PWc to the combustor 15, the fuel can be stably combusted without excessively decreasing the temperature of the combustion gas. That is, in the present embodiment, the actual output PWr of the gas turbine 1 can be less than or equal to the bleed output PWbl less than the intermediate output PWmid while stably operating the gas turbine 1.

In a case where the bleed controller 104 determines that the bleed condition is not satisfied in the bleed condition determination step S3, the bleed controller 104 closes the bleed amount adjustment valve 33, closes the inflow amount adjustment valve 34, and closes the exhaust amount adjustment valve 35 (the bleed stopping step S9). Accordingly, a part of the compressed air in the intermediate casing 3 is not bled as the bleed air, and the bleed air does not flow into the auxiliary turbine 37.

In a case where the bleed controller 104 determines that the bleed condition is not satisfied in the bleed condition determination step S3, the switching controller 105 determines whether or not the discharging condition is satisfied (a discharging condition determination step S10). Here, the discharging condition indicates that the required output PWc is greater than or equal to discharging output PWd is greater than the rated output PWrad of the gas turbine 1, and an amount of change in the required output PWc per unit time is greater than a predetermined value. In a case where it is determined that the discharging condition is satisfied, the switching controller 105 instructs the switch 54*b* provided in the BESS dedicated power line 51*b* to enter the ON state. Accordingly, the switch 54*b* enters the ON state, and the power stored in the power storage device 45 is discharged (a discharging step S11).

In a case where the switching controller 105 determines that the discharging condition is not satisfied in the discharging condition determination step S10, the switch 54*b* provided in the BESS dedicated power line 51*b* enters the OFF state, and the power stored in the power storage device 45 is not discharged (a discharging stopping step S12).

Figure 4:
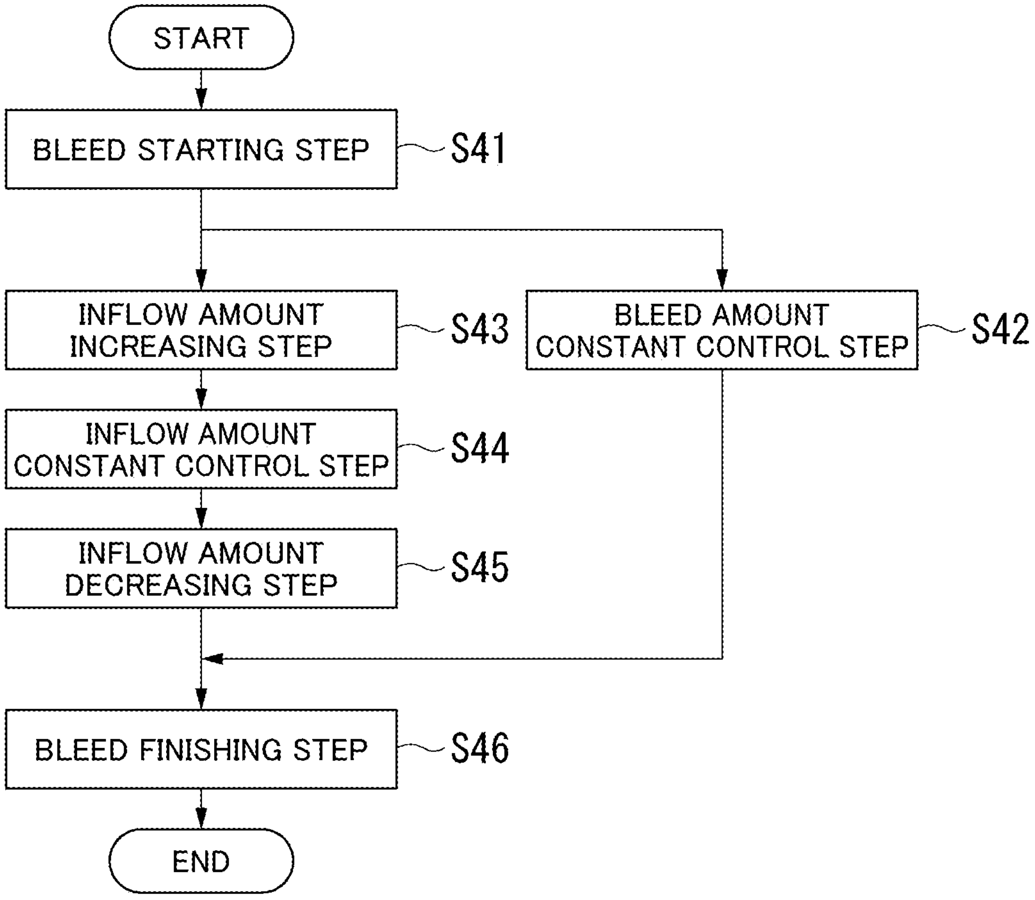
FIG. 4 is a flowchart showing details of a bleed control step in one embodiment according to the present disclosure.

Next, details of the bleed control step S4 will be described in detail in accordance with the flowchart shown in FIG. 4.

Figure 5:
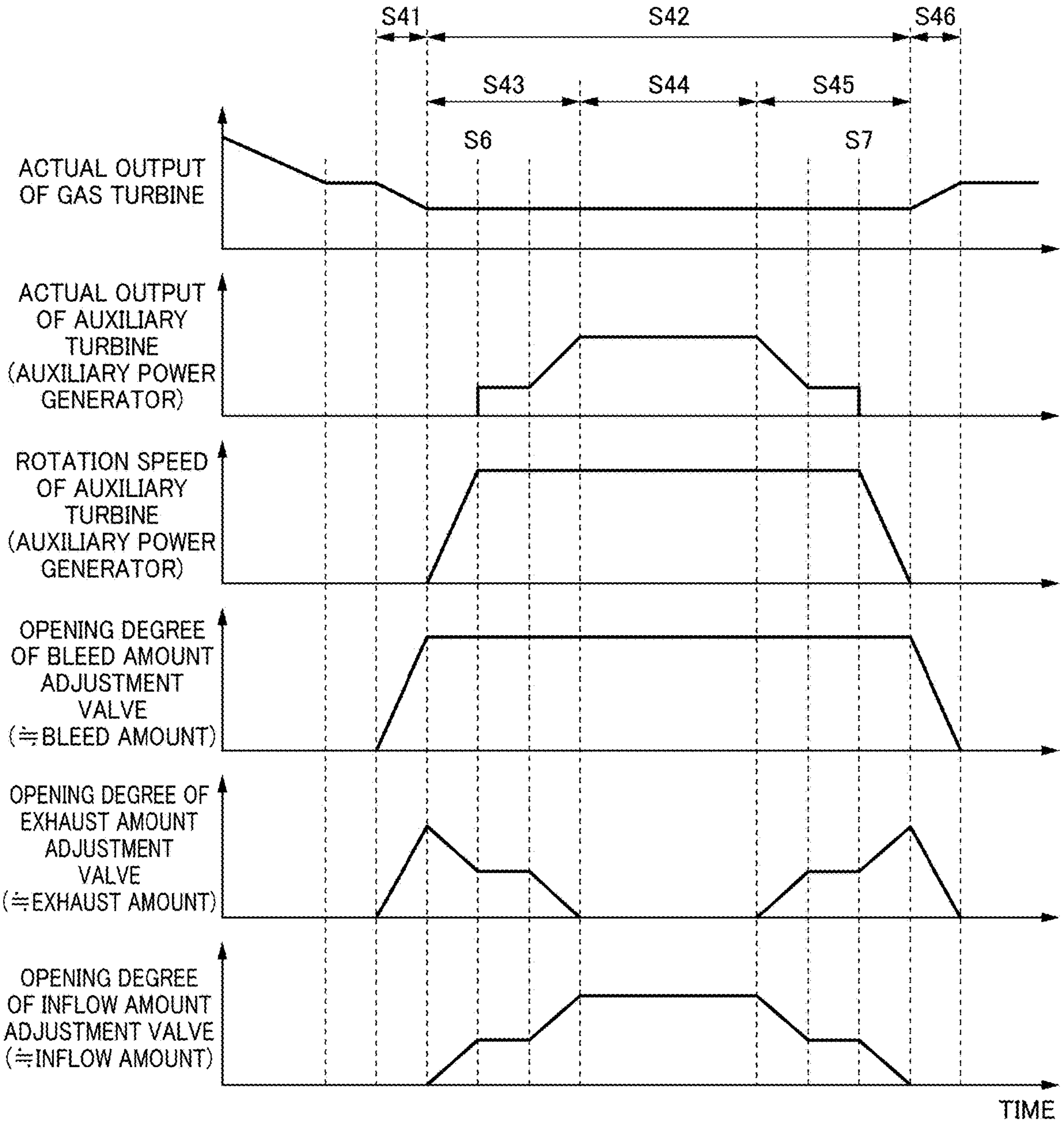
FIG. 5 is a time chart showing changes in the actual output of the gas turbine, the actual output of an auxiliary turbine, the rotation speed of the auxiliary turbine, the opening degree of a bleed amount adjustment valve, the opening degree of an exhaust amount adjustment valve, and the opening degree of an inflow amount adjustment valve during the bleed control step in one embodiment according to the present disclosure.

As described above using FIG. 3, in a case where it is determined that the bleed condition for bleeding a part of the compressed air in the intermediate casing 3 as the bleed air is satisfied in the bleed condition determination step S3, the bleed controller 104 executes a bleed starting step S41. In the bleed starting step S41, as shown in FIG. 5, the bleed controller 104 controls each of the opening degree of the bleed amount adjustment valve 33 and the opening degree of the exhaust amount adjustment valve 35 such that the bleed amount is gradually increased, and the exhaust amount is gradually increased in accordance with the increase in the bleed amount. By executing the bleed starting step S41, a part of the compressed air in the intermediate casing 3 is bled as the bleed air, and the whole bleed air is exhausted from the exhaust line 32. Accordingly, the actual output PWr of the gas turbine 1 is less than or equal to the bleed output PWbl less than the intermediate output PWmid.

In a case where the opening degree of the bleed amount adjustment valve 33 is set to a predetermined opening degree, for example, fully open, and the opening degree of the exhaust amount adjustment valve 35 is set to a predetermined opening degree, for example, fully open, the bleed starting step S41 is finished.

In a case where the bleed starting step S41 is finished, the bleed controller 104 executes a bleed amount constant control step S42. In the bleed amount constant control step S42, the bleed controller 104 controls the opening degree of the bleed amount adjustment valve 33 such that the bleed amount is maintained to be constant, as shown in FIG. 5. In this case, the opening degree of the bleed amount adjustment valve 33 is maintained at an opening degree when the bleed starting step S41 is finished, for example, fully open. Accordingly, the actual output of the gas turbine 1 is maintained at output when the bleed starting step S41 is finished, that is, the output less than or equal to the bleed output PWbl less than the intermediate output PWmid.

In a case where the bleed starting step S41 is finished, the bleed controller 104, as shown in FIG. 5, further executes an inflow amount increasing step S43 in parallel with the bleed amount constant control step S42. In the inflow amount increasing step S43, as shown in FIG. 5, the bleed controller 104 controls each of the opening degree of the exhaust amount adjustment valve 35 and the opening degree of the inflow amount adjustment valve 34 such that the exhaust amount is gradually decreased, and the inflow amount is gradually increased in accordance with the decrease in the exhaust amount.

By executing the inflow amount increasing step S43, the flow rate of the bleed air flowing into the auxiliary turbine 37 is gradually increased, and as shown in FIG. 5, a rotation speed of the auxiliary turbine 37 and the rotation speed of the auxiliary power generator 41 are gradually increased. In a case where the rotation speed of the auxiliary power generator 41 is equal to the predetermined rated rotation speed, the paralleling step S6 is executed, as described above using FIG. 3, and the power generated by the auxiliary power generator 41 is charged in the power storage device 45.

In a case where the execution of the inflow amount increasing step S43 continues even after the paralleling step S6 is executed, the actual output of the auxiliary turbine 37, in other words, the actual output of the auxiliary power generator 41, is set to the rated output.

In a case where the actual output of the auxiliary power generator 41 is set to the rated output, the bleed controller 104 executes an inflow amount constant control step S44 in parallel with the bleed amount constant control step S42. In the inflow amount constant control step S44, as shown in FIG. 5, the bleed controller 104 controls each of the opening degree of the inflow amount adjustment valve 34 and the opening degree of the exhaust amount adjustment valve 35 such that the inflow amount is maintained to be constant. In this case, the opening degree of the inflow amount adjustment valve 34 is maintained at an opening degree when the actual output of the auxiliary power generator 41 is set to the rated output, for example, fully open. The opening degree of the exhaust amount adjustment valve 35 is maintained at the opening degree when the actual output of the auxiliary power generator 41 is set to the rated output, for example, fully closed.

By executing the inflow amount constant control step S44, the actual output of the auxiliary power generator 41 is maintained at the rated output.

During the execution of the inflow amount constant control step S44, as described above using FIG. 3, in a case where it is determined that the bleed condition for bleeding a part of the compressed air in the intermediate casing 3 as the bleed air is not satisfied in the bleed condition determination step S3, the bleed controller 104 executes an inflow amount decreasing step S45 in parallel with the bleed amount constant control step S42. In the inflow amount decreasing step S45, as shown in FIG. 5, the bleed controller 104 controls each of the opening degree of the exhaust amount adjustment valve 35 and the opening degree of the inflow amount adjustment valve 34 such that the exhaust amount is gradually increased, and the inflow amount is gradually decreased in accordance with the increase in the exhaust amount.

By executing the inflow amount decreasing step S45, the flow rate of the bleed air flowing into the auxiliary turbine 37 is decreased, and the actual output of the auxiliary turbine 37, in other words, the actual output of the auxiliary power generator 41, is gradually decreased. In a case where the actual output of the auxiliary power generator 41 is decreased to predetermined output, the disconnection step S7 is executed, as described above using FIG. 3, and the auxiliary power generator 41 does not generate power.

In a case where the opening degree of the inflow amount adjustment valve 34 is, for example, fully closed, and the opening degree of the exhaust amount adjustment valve 35 is, for example, fully open, the inflow amount is substantially set to 0. The inflow amount decreasing step S45 and the bleed amount constant control step S42 are finished.

In a case where the inflow amount decreasing step S45 and the bleed amount constant control step S42 are finished, the bleed controller 104 executes a bleed finishing step S46. In the bleed finishing step S46, as shown in FIG. 5, the bleed controller 104 controls each of the opening degree of the bleed amount adjustment valve 33 and the opening degree of the exhaust amount adjustment valve 35 such that the bleed amount is gradually decreased, and the exhaust amount is gradually decreased in accordance with the decrease in the bleed amount. By executing the bleed finishing step S46, a part of the compressed air in the intermediate casing 3 is not bled as the bleed air. Accordingly, the actual output PWr of the gas turbine 1 is set to be greater than the bleed output PWbl. The bleed stopping step S9 described above using FIG. 3 is a step including the inflow amount decreasing step S45 and the bleed finishing step S46 described above.

In the present embodiment described above, a part of the compressed air generated by the compressor 10 is bled from the gas turbine 1 as the bleed air by opening the bleed amount adjustment valve 33. Thus, in the present embodiment, the flow rate of the compressed air flowing into the combustor 15 can be less than the minimum intake flow rate of the gas turbine 1. The combustor 15 is supplied with the fuel corresponding to the flow rate of the compressed air flowing into the combustor 15 for stable combustion of the fuel. Thus, in the present embodiment, the flow rate of the combustion gas can be decreased while stably combusting the fuel and maintaining the temperature of the combustion gas flowing into the turbine from the combustor 15. Accordingly, in the present embodiment, even in a case where the required output from the outside is less than output corresponding to the minimum intake flow rate of the gas turbine 1, the required output can be fulfilled.

In the present embodiment, by adjusting each of the opening degree of the bleed amount adjustment valve 33, the opening degree of the inflow amount adjustment valve 34, and the opening degree of the exhaust amount adjustment valve 35, the bleed amount that is the flow rate of the bleed air bled from the gas turbine 1 can be maintained to be constant while appropriately adjusting the flow rate of the bleed air flowing into the auxiliary turbine 37. Thus, in the present aspect, the gas turbine 1 and the auxiliary turbine 37 can be stably operated even in reducing the output of the gas turbine 1.

In the gas turbine 1 from which air is bled during a partial load operation, both of the flow rate of the compressed air and the flow rate of the fuel flowing into the combustor 15 are low. Thus, changes in these flow rates significantly affect a combustion state. While the same description is repeated, in the present embodiment, as described above, since the bleed amount can be maintained to be constant, the gas turbine 1 can be stably operated by reducing a change in the combustion state in the combustor 15 while bleeding the compressed air from the gas turbine 1.

In the present embodiment, even in a case where the inflow amount that is the flow rate of the bleed air flowing into the auxiliary turbine 37 is increased, or even in a case where the inflow amount is decreased, the bleed amount that is the flow rate of the bleed air bled from the gas turbine 1 can be maintained to be constant. In the present embodiment, even in a case where the bleed amount that is the flow rate of the bleed air bled from the gas turbine 1 is increased, or even in a case where the bleed amount is decreased, the inflow amount that is the flow rate of the bleed air flowing into the auxiliary turbine 37 can be maintained to be constant (for example, an inflow amount of 0).

In the present embodiment, since the inflow amount is maintained to be constant in a time slot in which the bleed amount is maintained to be constant, the gas turbine 1 and the auxiliary turbine 37 can be stably operated.

In the present embodiment, the phrase “the bleed amount is constant” means that a range of change in the bleed amount is within ±10% of the maximum bleed amount.

The phrase “the inflow amount is constant” means that a range of change in the inflow amount is within ±10% of the maximum inflow amount. In a case where it is assumed that the maximum bleed amount is 10% of the intake amount of the gas turbine 1, the phrase “the bleed amount is constant” means that the range of change in the bleed amount is within ±1% of the intake amount of the gas turbine 1.

Modification Example

The gas turbine system in the above embodiment includes the exhaust heat use equipment 20. However, the gas turbine system may not include the exhaust heat use equipment 20. The gas turbine system in the above embodiment includes the power storage device 45. However, the gas turbine system may not include the power storage device 45.

The gas turbine system in the above embodiment is a gas turbine power generation plant including a power generator. However, the gas turbine system may not be a gas turbine power generation plant. For example, the gas turbine 1 in the gas turbine system may be a drive source of a moving object, and the auxiliary turbine 37 may be a drive source of a mechanical load included in the moving object.

The control device 100 in the above embodiment includes the bleed controller 104. However, the bleed controller 104 may be omitted. In this case, an operator or the like adjusts each of the opening degree of the bleed amount adjustment valve 33, the opening degree of the inflow amount adjustment valve 34, and the opening degree of the exhaust amount adjustment valve 35.

The bleed amount adjustment valve 33, the inflow amount adjustment valve 34, and the exhaust amount adjustment valve 35 in the above embodiment are valves independent of each other. However, any two or all three of the bleed amount adjustment valve 33, the inflow amount adjustment valve 34, and the exhaust amount adjustment valve 35 may be configured with one three-way valve.

While preferred embodiments of the invention have been described and illustrated above, it should be understood that these are exemplary examples of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

Appendix

For example, the gas turbine system in the above embodiment and the modification example is understood as follows.

(1) A gas turbine system in a first aspect includes the gas turbine 1 including the compressor 10 that is configured to compress the air, the combustor 15 that is configured to generate the combustion gas by combusting the fuel in the compressed air which is the air compressed by the compressor 10, and the turbine 16 that can be driven by the combustion gas, the bleed line 31 through which a part of the compressed air generated by the compressor 10 can be bled from the gas turbine 1 as the bleed air, the exhaust line 32 that branches off from a middle of the bleed line 31 and through which a part of the bleed air which has flowed into the bleed line 31 can be exhausted, the auxiliary turbine 37 that is connected to the bleed line 31 and can be driven by the bleed air which has flowed through the bleed line 31, the bleed amount adjustment valve 33 that is provided in the bleed line 31 and that is configured to adjust the bleed amount which is the flow rate of the bleed air bled from the gas turbine 1, the inflow amount adjustment valve 34 that is provided in the bleed line 31 and that is configured to adjust the inflow amount which is the flow rate of the bleed air flowing into the auxiliary turbine 37, and the exhaust amount adjustment valve 35 that is provided in the exhaust line 32 and that is configured to adjust the exhaust amount which is the flow rate of the bleed air exhausted from the bleed line 31.

In the present aspect, a part of the compressed air generated by the compressor 10 is bled from the gas turbine 1 as the bleed air by opening the bleed amount adjustment valve 33. Thus, in the present aspect, the flow rate of the compressed air flowing into the combustor 15 can be less than the minimum intake flow rate of the gas turbine 1. The combustor 15 is supplied with the fuel corresponding to the flow rate of the compressed air flowing into the combustor 15 for stable combustion of the fuel. Thus, in the present aspect, the flow rate of the combustion gas flowing into the turbine from the combustor 15 can be decreased while stably combusting the fuel. Accordingly, in the present aspect, even in a case where the required output from the outside is less than the output corresponding to the minimum intake flow rate of the gas turbine 1, the required output can be fulfilled.

In the present aspect, by adjusting each of the opening degree of the bleed amount adjustment valve 33, the opening degree of the inflow amount adjustment valve 34, and the opening degree of the exhaust amount adjustment valve 35, the bleed amount that is the flow rate of the bleed air bled from the gas turbine 1 can be maintained to be constant while appropriately adjusting the flow rate of the bleed air flowing into the auxiliary turbine 37. Thus, in the present aspect, the gas turbine 1 and the auxiliary turbine 37 can be stably operated even in reducing the output of the gas turbine 1.

(2) The gas turbine system in a second aspect further includes, in the gas turbine system in the first aspect, the control device 100 configured to control each of the opening degree of the bleed amount adjustment valve 33, the opening degree of the inflow amount adjustment valve 34, and the opening degree of the exhaust amount adjustment valve 35.

In the present aspect, the gas turbine 1 and the auxiliary turbine 37 can be stably operated without an effort of the operator.

(3) In the gas turbine system in a third aspect, in the gas turbine system in the second aspect, the control device 100 executes the inflow amount increasing step S43 and the inflow amount decreasing step S45.

In the inflow amount increasing step S43, the control device 100 controls each of the opening degree of the exhaust amount adjustment valve 35 and the opening degree of the inflow amount adjustment valve 34 such that the exhaust amount is gradually decreased, and the inflow amount is gradually increased in accordance with the decrease in the exhaust amount. In the inflow amount decreasing step S45, the control device 100 controls each of the opening degree of the exhaust amount adjustment valve 35 and the opening degree of the inflow amount adjustment valve 34 such that the exhaust amount is gradually increased, and the inflow amount is gradually decreased in accordance with the increase in the exhaust amount.

In the present aspect, even in a case where the inflow amount that is the flow rate of the bleed air flowing into the auxiliary turbine 37 is increased, or even in a case where the inflow amount is decreased, the bleed amount that is the flow rate of the bleed air bled from the gas turbine 1 can be maintained to be constant.

(4) In the gas turbine system in a fourth aspect, in the gas turbine system in the third aspect, the control device 100 executes the bleed amount constant control step S42 and the inflow amount constant control step S44.

In the bleed amount constant control step S42, the control device 100 controls the opening degree of the bleed amount adjustment valve 33 such that the bleed amount is maintained to be constant. In the inflow amount constant control step S44, the control device 100 controls each of the opening degree of the inflow amount adjustment valve 34 and the opening degree of the exhaust amount adjustment valve 35 such that the inflow amount is maintained to be constant in the time slot in which the bleed amount is maintained to be constant by executing the bleed amount constant control step S42.

In the present aspect, since the inflow amount is maintained to be constant in the time slot in which the bleed amount is maintained to be constant, the gas turbine 1 and the auxiliary turbine 37 can be stably operated.

(5) In the gas turbine system in a fifth aspect, in the gas turbine system in the fourth aspect, the control device 100 executes the bleed starting step S41 before the bleed amount constant control step S42 and executes the bleed finishing step S46 after the bleed amount constant control step S42.

In the bleed starting step S41, the control device 100 controls each of the opening degree of the bleed amount adjustment valve 33 and the opening degree of the exhaust amount adjustment valve 35 such that the bleed amount is gradually increased, and the exhaust amount is gradually increased in accordance with the increase in the bleed amount. In the bleed finishing step S46, the control device 100 controls each of the opening degree of the bleed amount adjustment valve 33 and the opening degree of the exhaust amount adjustment valve 35 such that the bleed amount is gradually decreased, and the exhaust amount is gradually decreased in accordance with the decrease in the bleed amount.

In the present aspect, even in a case where the bleed amount that is the flow rate of the bleed air bled from the gas turbine 1 is increased, or even in a case where the bleed amount is decreased, the inflow amount that is the flow rate of the bleed air flowing into the auxiliary turbine 37 can be maintained to be constant (for example, an inflow amount of 0).

(6) In the gas turbine system in a sixth aspect, in the gas turbine system in the fifth aspect, the control device 100 executes the inflow amount increasing step S43 between the bleed starting step S41 and the bleed amount constant control step S42 and executes the inflow amount decreasing step S45 between the bleed amount constant control step S42 and the bleed finishing step S46.

(7) In the gas turbine system in a seventh aspect, in the gas turbine system in the fifth aspect or the sixth aspect, the control device 100 executes the bleed starting step S41 in a case where the output of the gas turbine 1 is less than or equal to the bleed output PWbl less than the rated output PWrad of the gas turbine 1.

In the present aspect, since the bleed starting step S41 in which the output of the gas turbine 1 is less than or equal to the bleed output PWbl less than the rated output PWrad of the gas turbine 1 is executed, the flow rate of the compressed air flowing into the combustor 15 can be decreased.

(8) The gas turbine system in an eighth aspect further includes, in the gas turbine system in any one of the third aspect to the seventh aspect, the auxiliary power generator 41 configured to generate power by driving the auxiliary turbine 37, and the switch 54*a* configured to disconnect electrical connection between the auxiliary power generator 41 and the power system.

The control device 100 includes the switching controller 105 that instructs the switch 54*a* to operate. In a case where the rotation speed of the auxiliary power generator 41 is equal to the predetermined rated rotation speed during the inflow amount increasing step S43, the switching controller 105 instructs the switch 54*a* to electrically connect the auxiliary power generator 41 to the power system. In a case where the actual output of the auxiliary power generator 41 is decreased to the predetermined output in the inflow amount decreasing step S45, the switching controller 105 instructs the switch 54$a$ to disconnect the electrical connection between the auxiliary power generator 41 and the power system.

For example, a bleed control method of the gas turbine system in the above embodiment and the modification example is understood as follows.

(9) A bleed control method of a gas turbine system in a ninth aspect is applied to the following gas turbine system.

The gas turbine system includes the gas turbine 1 including the compressor 10 that can compress the air, the combustor 15 that can generate the combustion gas by combusting the fuel in the compressed air which is the air compressed by the compressor 10, and the turbine 16 that can be driven by the combustion gas, the bleed line 31 through which a part of the compressed air generated by the compressor 10 can be bled from the gas turbine 1 as the bleed air, the exhaust line 32 that branches off from a middle of the bleed line 31 and through which a part of the bleed air which has flowed into the bleed line 31 can be exhausted, and the auxiliary turbine 37 that is connected to the bleed line 31 and can be driven by the bleed air which has flowed through the bleed line 31.

The bleed control method of a gas turbine system includes the bleed control step S4 of adjusting the bleed amount that is the flow rate of the bleed air bled from the gas turbine 1, adjusting the inflow amount that is the flow rate of the bleed air flowing into the auxiliary turbine 37, and adjusting the exhaust amount that is the flow rate of the bleed air exhausted from the bleed line 31.

In the present aspect, as in the gas turbine system in the first aspect, even in a case where the required output from the outside is less than the output corresponding to the minimum intake flow rate of the gas turbine 1, the required output can be fulfilled by opening the bleed amount adjustment valve 33.

In the present aspect, by adjusting each of the opening degree of the bleed amount adjustment valve 33, the opening degree of the inflow amount adjustment valve 34, and the opening degree of the exhaust amount adjustment valve 35, the bleed amount that is the flow rate of the bleed air bled from the gas turbine 1 can be maintained to be constant while appropriately adjusting the flow rate of the bleed air flowing into the auxiliary turbine 37. Thus, even in the present aspect, the gas turbine 1 and the auxiliary turbine 37 can be stably operated even in reducing the output of the gas turbine 1.

(10) In the bleed control method of a gas turbine system in a tenth aspect, in the bleed control method of a gas turbine system in the ninth aspect, the bleed control step S4 includes the inflow amount increasing step S43 and the inflow amount decreasing step S45.

In the inflow amount increasing step S43, the exhaust amount and the inflow amount are controlled such that the exhaust amount is gradually decreased, and the inflow amount is gradually increased in accordance with the decrease in the exhaust amount. In the inflow amount decreasing step S45, the exhaust amount and the inflow amount are controlled such that the exhaust amount is gradually increased, and the inflow amount is gradually decreased in accordance with the increase in the exhaust amount.

In the present aspect, as in the gas turbine system in the third aspect, even in a case where the inflow amount that is the flow rate of the bleed air flowing into the auxiliary turbine 37 is increased, or even in a case where the inflow amount is decreased, the bleed amount that is the flow rate of the bleed air bled from the gas turbine 1 can be maintained to be constant.

(11) In the bleed control method of a gas turbine system in an eleventh aspect, in the bleed control method of a gas turbine system in the tenth aspect, in the bleed control step S4, the bleed amount constant control step S42 and the inflow amount constant control step S44 are executed.

In the bleed amount constant control step S42, the bleed amount is controlled such that the bleed amount is maintained to be constant. In the inflow amount constant control step S44, the exhaust amount and the inflow amount are controlled such that the inflow amount is maintained to be constant in the time slot in which the bleed amount is maintained to be constant by executing the bleed amount constant control step S42.

In the present aspect, as in the gas turbine system in the fourth aspect, since the inflow amount is maintained to be constant in the time slot in which the bleed amount is maintained to be constant, the gas turbine 1 and the auxiliary turbine 37 can be stably operated.

(12) In the bleed control method of a gas turbine system in a twelfth aspect, in the bleed control method of a gas turbine system in the eleventh aspect, the bleed control step S4 includes the bleed starting step S41 executed before the bleed amount constant control step S42, and the bleed finishing step S46 executed after the bleed amount constant control step S42.

In the bleed starting step S41, the bleed amount and the exhaust amount are controlled such that the bleed amount is gradually increased, and the exhaust amount is gradually increased in accordance with the increase in the bleed amount. In the bleed finishing step S46, the bleed amount and the exhaust amount are controlled such that the bleed amount is gradually decreased, and the exhaust amount is gradually decreased in accordance with the decrease in the bleed amount.

In the present aspect, as in the gas turbine system in the fifth aspect, even in a case where the bleed amount that is the flow rate of the bleed air bled from the gas turbine 1 is increased, or even in a case where the bleed amount is decreased, the inflow amount that is the flow rate of the bleed air flowing into the auxiliary turbine 37 can be maintained to be constant (for example, an inflow amount of 0).

(13) In the bleed control method of a gas turbine system in a thirteenth aspect, in the bleed control method of a gas turbine system in the twelfth aspect, the inflow amount increasing step S43 is executed between the bleed starting step S41 and the bleed amount constant control step S42.

The inflow amount decreasing step S45 is executed between the bleed amount constant control step S42 and the bleed finishing step S46.

(14) In the bleed control method of a gas turbine system in a fourteenth aspect, in the bleed control method of a gas turbine system in the twelfth aspect or the thirteenth aspect, the bleed starting step S41 is executed in a case where the output of the gas turbine 1 is less than or equal to the bleed output PWbl less than the rated output PWrad of the gas turbine 1.

(15) In the bleed control method of a gas turbine system in a fifteenth aspect, in the bleed control method of a gas turbine system in any one of the tenth aspect to the fourteenth aspect, the gas turbine system includes the auxiliary power generator 41 configured to generate power by driving the auxiliary turbine 37, and the switch 54$a$ configured to disconnect the electrical connection between the auxiliary power generator 41 and the power system.

The bleed control method of a gas turbine system further includes the paralleling step S6 of instructing, in a case where the rotation speed of the auxiliary power generator 41 is equal to the predetermined rated rotation speed during the inflow amount increasing step S43, the switch 54*a* to electrically connect the auxiliary power generator 41 to the power system, and the disconnection step S7 of instructing, in a case where the actual output of the auxiliary power generator 41 is decreased to the predetermined output during the inflow amount decreasing step S45, the switch 54*a* to disconnect the electrical connection between the auxiliary power generator 41 and the power system.

EXPLANATION OF REFERENCES

1 Gas turbine
2 Gas turbine rotor
3 Intermediate casing
4 Fuel line
5 Fuel valve
6 Gas turbine generator
10 Compressor
11 Compressor rotor
11*s* Compressor rotor shaft
11*b* Blade row
12 Compressor casing
13 Intake amount adjuster
13*v* Inlet guide vane (IGV)
13*d* Driver
15 Combustor
16 Turbine
17 Turbine rotor
17*s* Turbine rotor shaft
17*b* Blade row
18 Turbine casing
20 Exhaust heat use equipment
21 Exhaust heat recovery boiler
21*d* Duct
21*t* Heat transfer tube
22 Chimney
23 Steam turbine
24 Main steam line
25 Condenser
26 Water supply line
27 Water supply pump
30 Bleed device
31 Bleed line
32 Exhaust line
33 Bleed amount adjustment valve
34 Inflow amount adjustment valve
35 Exhaust amount adjustment valve
37 Auxiliary turbine
38 Auxiliary turbine rotor
39 Auxiliary turbine casing
40 Auxiliary power generation equipment
41 Auxiliary power generator
42 Speed changer
43 Clutch
45 Power storage device
46 Storage battery
47 AC/DC converter
50 Power system equipment
51*g* GT power generator dedicated power line
51*a* AT power generator dedicated power line
51*b* BESS dedicated power line
51*p* In-plant shared power line
51*c* External connection power line
53*a*, 53*b*, 53*c*, 53*g* Transformer
54*a*, 54*b*, 54*c*, 54*g* Switch
55 Output meter
60 External power system
65 Power storage device
66 Storage battery
67 AC/DC converter
100 Control device
101 Main controller
102 Fuel controller
103 IGV controller
104 Bleed controller
105 Switching controller
A Air
F Fuel
PWr Actual output
PWc Required output
PWrad Rated output
PWmid Intermediate output
PWbl Bleed output
Ar Rotor axis
Da Axis direction
Dau Axis upstream side
Dad Axis downstream side

What is claimed is:

1. A bleed control method of a gas turbine system including
- a gas turbine including a compressor that is configured to compress air, a combustor that is configured to generate combustion gas by combusting fuel in compressed air which is the air compressed by the compressor, and a turbine that is driven by the combustion gas,
- a bleed line through which a part of the compressed air generated by the compressor is bled from the gas turbine as bleed air,
- an exhaust line that branches off from a middle of the bleed line and through which a part of the bleed air which has flowed into the bleed line is exhausted, and
- an auxiliary turbine that is connected to the bleed line and driven by the bleed air which has flowed through the bleed line, the bleed control method comprising:
- a bleed control step which includes
  - adjusting a bleed amount which is a flow rate of the bleed air bled from the gas turbine,
  - adjusting an inflow amount which is a flow rate of the bleed air flowing into the auxiliary turbine, and
  - adjusting an exhaust amount which is a flow rate of the part of the bleed air exhausted through the exhaust line, wherein the bleed control step includes an inflow amount increasing step and an inflow amount decreasing step,
- in the inflow amount increasing step, the exhaust amount and the inflow amount are controlled such that the exhaust amount is gradually decreased, and the inflow amount is gradually increased in accordance with the decrease in the exhaust amount, and
- in the inflow amount decreasing step, the exhaust amount and the inflow amount are controlled such that the exhaust amount is gradually increased, and the inflow amount is gradually decreased in accordance with the increase in the exhaust amount, wherein in the bleed control step, a bleed amount constant control step and an inflow amount constant control step are executed, in the bleed amount constant control step, the bleed amount is controlled such that the bleed amount is maintained to be constant, and in the inflow amount constant control step, the exhaust amount and the inflow amount are controlled such that the inflow amount is maintained to be constant in a time slot in which the bleed amount is maintained to be constant by executing the bleed amount constant control step, wherein the bleed control step includes a bleed starting step executed before the bleed amount constant control step, and a bleed finishing step executed after the bleed amount constant control step, in the bleed starting step, the bleed amount and the exhaust amount are controlled such that the bleed amount is gradually increased, and the exhaust amount is gradually increased in accordance with the increase in the bleed amount, and in the bleed finishing step, the bleed amount and the exhaust amount are controlled such that the bleed amount is gradually decreased, and the exhaust amount is gradually decreased in accordance with the decrease in the bleed amount, wherein the inflow amount increasing step is executed between the bleed starting step and the bleed amount constant control step, and wherein the inflow amount decreasing step is executed between the bleed amount constant control step and the bleed finishing step.

2. A bleed control method of a gas turbine system including a gas turbine including a compressor that is configured to compress air, a combustor that is configured to generate combustion gas by combusting fuel in compressed air which is the air compressed by the compressor, and a turbine that is driven by the combustion gas, a bleed line through which a part of the compressed air generated by the compressor is bled from the gas turbine as bleed air, an exhaust line that branches off from a middle of the bleed line and through which a part of the bleed air which has flowed into the bleed line is exhausted, and an auxiliary turbine that is connected to the bleed line and driven by the bleed air which has flowed through the bleed line, the bleed control method comprising:

a bleed control step which includes adjusting a bleed amount which is a flow rate of the bleed air bled from the gas turbine, adjusting an inflow amount which is a flow rate of the bleed air flowing into the auxiliary turbine, and adjusting an exhaust amount which is a flow rate of the part of the bleed air exhausted through the exhaust line, wherein the bleed control step includes an inflow amount increasing step and an inflow amount decreasing step, in the inflow amount increasing step, the exhaust amount and the inflow amount are controlled such that the exhaust amount is gradually decreased, and the inflow amount is gradually increased in accordance with the decrease in the exhaust amount, and in the inflow amount decreasing step, the exhaust amount and the inflow amount are controlled such that the exhaust amount is gradually increased, and the inflow amount is gradually decreased in accordance with the increase in the exhaust amount, wherein in the bleed control step, a bleed amount constant control step and an inflow amount constant control step are executed, and in the bleed amount constant control step, the bleed amount is controlled such that the bleed amount is maintained to be constant, in the inflow amount constant control step, the exhaust amount and the inflow amount are controlled such that the inflow amount is maintained to be constant in a time slot in which the bleed amount is maintained to be constant by executing the bleed amount constant control step, wherein the bleed control step includes a bleed starting step executed before the bleed amount constant control step, and a bleed finishing step executed after the bleed amount constant control step, in the bleed starting step, the bleed amount and the exhaust amount are controlled such that the bleed amount is gradually increased, and the exhaust amount is gradually increased in accordance with the increase in the bleed amount, and in the bleed finishing step, the bleed amount and the exhaust amount are controlled such that the bleed amount is gradually decreased, and the exhaust amount is gradually decreased in accordance with the decrease in the bleed amount, wherein the bleed starting step is executed when an output of the gas turbine is less than or equal to a bleed output and less than a rated output of the gas turbine.

3. A bleed control method of a gas turbine system including a gas turbine including a compressor that is configured to compress air, a combustor that is configured to generate combustion gas by combusting fuel in compressed air which is the air compressed by the compressor, and a turbine that is driven by the combustion gas, a bleed line through which a part of the compressed air generated by the compressor is bled from the gas turbine as bleed air, an exhaust line that branches off from a middle of the bleed line and through which a part of the bleed air which has flowed into the bleed line is exhausted, an auxiliary turbine that is connected to the bleed line and driven by the bleed air which has flowed through the bleed line, an auxiliary power generator configured to generate power by driving the auxiliary turbine, and a switch configured to disconnect electrical connection between the auxiliary power generator and a power system, the bleed control method comprising:

a bleed control step which includes adjusting a bleed amount which is a flow rate of the bleed air bled from the gas turbine, adjusting an inflow amount which is a flow rate of the bleed air flowing into the auxiliary turbine, and adjusting an exhaust amount which is a flow rate of the part of the bleed air exhausted through the exhaust line, wherein the bleed control step includes an inflow amount increasing step and an inflow amount decreasing step, in the inflow amount increasing step, the exhaust amount and the inflow amount are controlled such that the exhaust amount is gradually decreased, and the inflow amount is gradually increased in accordance with the decrease in the exhaust amount, and in the inflow amount decreasing step, the exhaust amount and the inflow amount are controlled such that the exhaust amount is gradually increased, and the inflow amount is gradually decreased in accordance with the increase in the exhaust amount, and wherein the bleed control method further comprises a paralleling step of instructing, when a rotation speed of the auxiliary power generator is equal to a predetermined rated rotation speed during the inflow amount increasing step, the switch to electrically connect the auxiliary power generator to the power system, and a disconnection step of instructing, when an actual output of the auxiliary power generator is decreased to a predetermined output during the inflow amount decreasing step, the switch to disconnect the electrical connection between the auxiliary power generator and the power system.

* * * * *